United States Patent Office 3,549,771
Patented Dec. 22, 1970

3,549,771
RETARDING THE GROWTH OF MICROORGANISMS WITH DIMETHYL SULFOXIDE
Robert J. Herschler, Camas, Wash., assignor to Crown Zellerbach Corporation, San Francisco, Calif., a corporation of Nevada
No Drawing. Continuation-in-part of application Ser. No. 346,366, Feb. 10, 1964. This application Apr. 29, 1969, Ser. No. 820,279
Int. Cl. A61l 13/00
U.S. Cl. 424—337                    20 Claims

ABSTRACT OF THE DISCLOSURE

A method for retarding the growth of microorganisms encountered in various industrial applications or in vitro by contacting such microorganisms with an effective amount of dimethyl sulfoxide. Also, a method for rendering resistant microorganisms susceptible to conventional growth-retarding agents by contacting the microorganism with an effective amount of dimethyl sulfoxide and said growth-retarding agent.

CROSS REFERENCE TO RELATED APPLICATIONS

This application is a continuation-in-part of copending patent application Ser. No. 346,366 filed Feb. 10, 1964, now abandoned.

This invention relates generally to a method for the growth of microorganisms encountered in various industrial applications or in vitro, including those species causing diseases in plants, animals and man, such as tabulated in Specter, Handbook of Biological Data, W. B. Sanders Co., Philadelphia 1956, pp. 492–505. Tables 422, 423, 424, 425, 426, 427, and pp. 510–514, Tables 430–431. It particularly relates to retarding the growth microorganisms in an improved manner with known biocidal and biostatic agents.

When the phrase "retarding the growth of the microorganisms" is used, it may refer to a composition where biocidal or biostatic effects of known agents are enhanced; it may also refer to an antibacterial, antiviral or antiorganisms susceptible to known biocides and biostats; and it may also refer to an antibacterial, antiviral or antifugal action of an agent which will be disclosed.

The phrase "industrial applications" is intended to connote those applications involving retarding the growth of microorganisms existing on or in "artificial" or non-living substrates as opposed to retarding the growth of microorganisms existing on or in humans, animals or living plants.

The phrase "in vitro" is employed in its usual sense to mean microorganisms growing in laboratory vessels, such as as Petri dishes, slant tubes, etc.

An object is a method useful for retarding the growth of microorganisms in various industrial applications.

Another object is a method of improving biocidal and biostatic properties of known agents.

Another object is a method for making resistant strains of microorganisms susceptible to known biocidal and biostatic agents.

Yet another object is a method for counteracting animal tissue-infecting microorganisms encountered in vitro with a particular compound.

Still another object is a method for counteracting animal tissue-infecting microorganisms encountered in vitro by contacting sites thereof with known biocidal and biostatic agents and with a compound which potentiates the action of such agents.

Still another object is a method of counteracting animal tissue-causing infections caused at least in part by resistant strains, by contacting in vitro such strains with compositions containing known biocides or biostats and a compound to render the microorganisms susceptible thereto.

These objects are attained along with other objects which will become apparent when reading the following disclosure.

It has been found that retarding the growth of microorganisms is obtained by contacting them with an effective amount of dimethyl sulfoxide. The growth of various microorganisms is stopped or markedly reduced in various substrates or cultures when an effective amount of dimethyl sulfoxide is placed into such substrates or cultures alone or together with known biocides or biostats. Dimethyl sulfoxide may be prepared by various methods such as described in U.S. Pats. 2,581,050, 2,935,533 and 2,702,824, and is supplied by Crown Zellerbach Corp., San Francisco, Calif.

The effective amount of dimethyl sulfoxide to be used to stop growth in the culture stage is in part determined by the identity of a particular strain of microorganisms. Industrial control of microorganisms is used in general slimicide control, control of growth in recycled water as in air conditioning units, in protection of fibers in the textile industry and the like. It will be recognized that critical amounts cannot be pre-established because this will depend on the particular conditions of the industrial operation, such as exposure to elements, content, volume, amounts and the like.

It will also be disclosed how dimethyl sulfoxide in compositions with known biocides and biostats increases or potentiates the effect of such agents. The mechanism of action is not understood but it is supposed that increased penetration of the mircoorganism may be effected or achieved. The increased penetration of animal tissue is disclosed and claimed in a copending application Ser. No. 753,231. The control of plant viruses is disclosed and claimed in Pat. No. 3,334,012.

It will also be disclosed that dimethyl sulfoxide in compositions renders previously resistant strains of microorganisms susceptible to the antimicrobial action of known agents. The mechanism of action is also not understood, but again is believed to be somehow related to increased penetration of the microorganism cell wall. The microorganisms to be controlled within the purposes of this disclosure include bacteria, fungi, yeasts and viruses.

It is disclosed and claimed in Ser. No. 622,088 that vegetative growth of microorganisms is enhanced with effectively small amounts of dimethyl sulfoxide.

The following examples are presented to illustrate various embodiments of the invention but it should be understood that they are not meant to represent an exclusive teaching.

EXAMPLE 1

Control with different concentrations of dimethyl sulfoxide

| | Parts by weight |
|---|---|
| Lactic acid | 2.3 |
| Total nitrogen | 0.7 |
| Amino nitrogen | 0.3 |
| Reducing sugars | 0.7 |
| Inert solids | 2.1 |
| Potassium dihydrogen phosphate | 0.1 |
| Magnesium sulfate | 0.005 |
| Water, sufficient to make 100 parts. | |

Two batches of fortified corn steep broth were prepared according to the foregoing formulation and strains of *Penicillium notatum* were cultured in one batch and strains of *Aspergillus niger* were cultured in the second batch. These fungi fall within the filamentous ascomycetes class. To each culture in each group was added dimethyl sulfoxide in sequential amounts which increased incrementally. The first addition was 500 p.p.m. and then 10,000 p.p.m., which was equivalent to 1% by weight of the culture. Thereafter, the amount was increased by 1% through a series starting at 1% and ending at 10%. The culture conditions otherwise remained standard.

Concentrations of the microorganisms in the broth were determined after each addition. It was shown that concentrations of dimethyl sulfoxide up to about 3% measurably enhanced vegetative growth with a maximum yield of 16% compared to a control. Sporulation at the same time was depressed with incremental increases of dimethyl sulfoxide concentrations. Above 5% dimethyl sulfoxide concentration levels the growth was depressed being at the lowest level in the highest dimethyl sulfoxide culture concentration of 10%. Enhanced vegetative growth may therefore be obtained with lower dimethyl sulfoxide concentrations in the culture. Higher concentrations tend to inhibit growth of both vegetative and spore forms of fungi in the culture.

EXAMPLE 2

Control of microorganisms on wood pulp substrate

A mixed culture of slime-forming organisms such as *E. coli, B. subtilis* and *A. aerogens*, which are resistant to phenyl mercuric acetate (PMA), were cultured on a groundwood pulp substrate. This is a dilute water slurry of raw groundwood-containing wood pulp, dissolved sugars, low M.W. (molecular weight) lignins, proteins, etc. One liter aliquots of pulp were contacted with PMA alone, PMA plus dimethyl sulfoxide, dimethyl sulfoxide alone and a final aliquot served as a control. Each aliquot had a 0.3% solids pulp and contained total microorganism counts in excess of 500,000 per ml. The following table shows the results:

| Treatment | Total microorganism count per ml. | | |
|---|---|---|---|
| | 1 hour | 12 hours | 24 hours |
| 3 p.p.m. of PMA | 180,000 | 379,000 | 500,0000 |
| 3 p.p.m. of PMA plus 20 p.p.m. of dimethyl sulfoxide | 2,310 | 47,600 | 500,000 |
| 20 p.p.m. of dimethyl sulfoxide | 500,000 | 500,000 | 500,000 |
| Control, no treatment | 500,000 | 500,000 | 500,000 |

The time in hours refers to the span from addition of treatment to plating. The plating medium was Sabourauds Dextrose Agar (Difco). The incubation period of the plates was 24 hours at 35° C. The example clearly shows that dimethyl sulfoxide enhances or potentiates the effect of PMA by apparently reducing the subsequent activity or affinity of PMA for the pulp substrate which would deactivate PMA.

EXAMPLE 3

Control of microorganisms with dimethyl sulfoxide

Different groups of cultures containing *Bacillus subtilis*, a spore-forming soil-borne bacterial, and *Eschericia coli*, an intestinal bacteria, were prepared. Into each culture was introduced a 50% solution of dimethyl sulfoxide. The mixtures were maintained for 24 hours and then the mixtures were diluted to 1% with sterile water. The diluted mixture was plated using a nutrient agar. The plates were incubated at 37° C. for 48 hours, examined and counts were made. The plates involving *E. coli* were sterile, and plates involving *B. subtilis* contained only one colony of a foreign organism (*B. mycoides*), which was believed to have been air-introduced contaminant. Dimethyl sulfoxide at 50% concentration therefore showed biocidal activity.

EXAMPLE 4

Control of microorganisms with dimethyl sulfoxide

The tubercle bacillus, *Mycobacterium tuberculosis* was cultured in a standard liquid medium. Dimethyl sulfoxide was introduced to the medium so that it was present in a concentration of 15% v./v. basis. Growth of the bacillus was completely inhibited. This proved to be bacteriostasis.

EXAMPLE 5

Control of microorganisms with dimethyl sulfoxide

Different cultures were prepared containing *E. coli, Staphylococcus aureus*, and *Pseudomonas aeruginosa*. In each culture was placed 10% of aqueous dimethyl sulfoxide on a v./v. basis. Complete inhibition of growth occurred in each culture. Transfers from these treated cultures were made to fresh standard culture mediums and prolific growth occurred in each new culture medium.

The example illustrates that dimethyl sulfoxide is bacteriostatic against these strains of microorganisms. The *E. coli* bacteria is very common and widely distributed. It is an excellent and ubiquitous scavenger, hydrolizing a wide variety of proteins, fats, carbohydrates, and other organic compounds. They are found in soil, fresh waters and ocean waters and decomposing organic matter including sewage. The *S. aureus* is a pathogenic micrococcus and is distinguished by its golden yellow pigment. It is recognized as the cause of suppurative (pus-forming) conditions: mastitis of cows, boils, carbuncles, and internal abcesses in men.

EXAMPLE 6

Control of fungus growth

Dion's 2% agar media in petri dishes were inoculated with 2 mm. plugs of *Monilinia fructicola* spore-bearing mycelia taken from 5-day old cultures. The media contained the following:

(1) 4 p.p.m. Dowicide G (sodium pentachlorophenate);
(2) 2% DMSO;
(3) A mixture of 4 p.p.m. Dowicide G and 2% DMSO.

The plugs were incubated for 5 days at 24° C. Radial growth of the *M. fruticola* was measured. The radial growth for the various media is as follows:

| Media: | Growth, mm. |
|---|---|
| 1 | 15 |
| 2 | 17 |
| 3 | 0 |

EXAMPLE 7

Control of virus growth

*E. coli* phage were suspended in 80% v./v. DMSO in tris(hydroxymethyl) aminomethane buffered saline (pH 6.8) at 25° C. for 30 minutes. A control suspension was also made in the same saline without DMSO. Residual infectivity was measured by plaque assay on 2.57 MacConkey agar at 37° C. for 18 hours. The phage in the control saline (without DMSO) had an infectivity of about $17.0\times10^{7}$ plaques/ml. The phage in the 80% DMSO saline were completely inactivated (no plaques).

The following Examples 8 to 10 are directed to control of viruses with DMSO. These examples originally appeared in parent application Ser. No. 346,366 and subsequently incorporated into a divisional continuation-in-part application which resulted in U.S. Pat. No. 3,334,012. Insofar as the subject matter of these examples relates to controlling viruses in living plants, they are covered by the claims of Pat. 3,334,012.

EXAMPLE 8

Control of stony pit virus in pear trees

Six pear trees were uniformly infected with a virus-causing pear fruit malformation termed "Stony Pit." The fruit of these trees was graded in the season of 1961 and found to bear more than 95% infected fruit. Such fruit shows at least one visible surface blemish with tissue pit. The first group of two trees was a control and received 100 ml. of water. The second group of trees received 50 ml. of water and 50 ml. of dimethyl sulfoxide, and the third group of two trees received 75 ml. of water and 25 ml. of dimethyl sulfoxide.

The trees were treated by directly injecting 100 ml. of liquid into the xylem under a hydrostatic head of 4 feet to force in the liquid. The total amount of liquid was injected in 24 hours or less, once per month in the two growing seasons of April to October, 1962 and 1963.

After the 1962 season, there was considerable symptomatic relief of the second group on 50% dimethyl sulfoxide, and only minor relief with the third group receiving 25% dimethyl sulfoxide.

After the 1963 season, more than 95% of the fruit of the first or control group was pitted and deformed, only 4.5% of the fruit in the second group on 50% dimethyl sulfoxide, and 47% in the third group on 25% dimethyl sulfoxide showed signs of malformation.

The foregoing example illustrates the antiviral effect of dimethyl sulfoxide.

EXAMPLE 9

Control of leaf mosaic

Strawberry plants free of virus signs were artificially infected with a virus causing the diesease, leaf mosaic. A known antiviral agent, 6-mercaptopurine, and dimethyl sulfoxide were administered under controlled conditions. Applications of the liquids were made to four groups of three plants per group with an air-powered de Vilbis sprayer, as follows:

(1) 500 p.p.m. of 6-mercaptopurine (in 10/90 ethanol/water);
(2) 500 p.p.m. dimethyl sulfoxide (in water);
(3) 500 p.p.m. dimethyl sulfoxide plus 100 p.p.m. 6-mercaptopurine (in water);
(4) Control of 10/90 ethanol/water.

In control group number 4 the virus signs were seen in 3–4 days. With groups number 1 and number 2, the virus signs were controlled for 1 week, but with group number 3, no signs were seen after 6 weeks.

EXAMPLE 10

Control of virus growth

Tobacco mosaic virus (TMV) suspension of high titer was treated with solutions of 1%, 2%, and 25% aqueous dimethyl sulfoxide (DMSO). The control and test plants were inoculated with air-propelled carborundum particles. The control plant suspended in water produced a high number of necrotic lesions, 479 per leaf when read five days after inoculation. TMV treated with 1% dimethyl sulfoxide produced 283 discrete lesions per leaf; with 2% DMSO 170 lesions per leaf; with 5% DMSO 169 lesions per leaf; and with 25% DMSO there was sufficient phytotoxicity to void testing. It is seen that increasing concentrations of DMSO in water reduced the discrete lesion count. Results probably indicate virustasis, not virucidal action.

The foregoing examples illustrate the retarding of microorganism growth by contact with dimethyl sulfoxide. It has been shown how different concentrations and amounts of dimethyl sulfoxide compositions are effective in different applications. The invention is practiced to particular advantage when dimethyl sulfoxide is used in combination with known biocidal and biostatic agents to control microorganisms. Such biocides include the various antibacterial, antifungal and antiviral agents. The advantage of the combination resides in potentiating such agents or in obtaining a synergistic combination. Such combinations are further useful because resistant microorganisms have been shown to be rendered sensitive to the known biocide or biostat in the combination.

No strict range or concentrations for use may be prescribed for retarding microorganism growth, because there is no uniform critical level. Such are readily determined by the expertise of the practitioner who may rely on standard criteria for evaluating the effectiveness of a particular composition for a particular industrial or other application.

The following table sets forth various microorganisms and the minimum microbiocidal concentration of DMSO. Conventional, serial, twofold tube dilution cultures were grown employing Difco Pen-assay broth (double strength); incubation being for 24 hours at 37° C. The lowest DMSO concentration in which growth failed to occur after subculture was considered the minimum microbiocidal concentration.

TABLE 1.—MICROBIOCIDAL ACTIVITY OF DMSO

| Microorganism: | Minimum microbiocidal concentration of DMSO (percent by weight) |
|---|---|
| (A) Bacteria: | |
| S. aureus | 40 |
| S. pyogenes | 30 |
| Bacillus subtilis | 30 |
| E. coli | 20 |
| Aerobacter aerogenes | 20 |
| (B) Fungi: | |
| Aerobacter aerogenes | 20 |
| Saccharomyces cerevisiae | 20 |
| Penicillium notatum | 30 |
| Candida albicans | 30 |

Tests made on various virus cultures indicate that at 70%–80% v./v. DMSO concentrations the viruses are inactivated.

The disclosed method may be used in the laboratory for different evaluations and tests and in a multitude of industrial applications. Uncontrolled microorganism growth in many industrial uses may now be retarded with dimethyl sulfoxide alone or in combination with known biocides and biostats. Dimethyl sulfoxide is available in a convenient liquid form which may be diluted with various liquids or used at 100% concentration. This convenient physical form provides advantages in handling.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A method for retarding the growth of microorganisms encountered in various industrial applications comprising contacting said microorganisms with an effective amount of dimethyl sulfoxide.

2. A method as in claim 1 further characterized in that viral growth is retarded.

3. A method as in claim 1 further characterized in that bacterial growth is retarded.

4. A method as in claim 1 further characterized in that fungal growth is retarded.

5. A method of retarding the growth of microorganisms encountered in various industrial applications comprising contacting the microorganisms with an effective amount of dimethyl sulfoxide and a known agent for retarding such growth.

6. A method of retarding the growth of microorganisms encountered in various industrial applications comprising contacting the microorganisms with dimethyl sulfoxide and an agent known for retarding such growth, but to which the microorganism had developed a resistance, thereby rendering the resistant microorganism susceptible to the agent and retarding the growth of the microorganism.

7. A method as in claim 6 further characterized in that bacterial growth is retarded.

8. A method for retarding the growth of microorganisms encountered in various industrial applications which consists of the step of contacting the microorganisms with an effective amount of dimethyl sulfoxide.

9. A method for retarding the growth of microorganisms encountered in vitro which consists of the step of contacting the microorganisms with an effective amount of dimethyl sulfoxide and an agent known for retarding the growth of microorganisms.

10. The method of claim 9 further characterized in that bacterial growth is retarded.

11. A method for retarding the growth of microorganisms encountered in vitro as animal tissue-infecting microorganisms which comprises contacting said microorganisms with an effective amount of dimethyl sulfoxide.

12. A method as in claim 11 further characterized in that viral growth is retarded.

13. A method as in claim 11 further characterized in that bacterial growth is retarded.

14. A method as in claim 11 further characterized in that fungal growth is retarded.

15. A method of retarding the growth of microorganisms encountered in vitro as animal tissue-infecting microorganisms which comprises contacting the microorganisms with an effective amount of dimethyl sulfoxide and a known agent for retarding such growth.

16. A method of retarding the growth of microorganisms encountered in vitro as animal tissue-infecting microorganisms which comprises contacting the microorganisms with dimethyl sulfoxide and an agent known for retarding such growth, but to which the microorganism had developed a resistance, thereby rendering the resistant microorganism susceptible to the agent and retarding the growth of the microorganism.

17. A method as in claim 16 further characterized in that bacterial growth is retarded.

18. A method for retarding the growth of microorganisms encountered in vitro which consists of the step of contacting the microorganisms with an effective amount of dimethyl sulfoxide.

19. A method for retarding the growth of microorganisms encountered in vitro as animal tissue-infecting microorganisms which consists of the step of contacting the microorganisms with an effective amount of dimethyl sulfoxide and an agent known for retarding the growth of microorganisms.

20. The method of claim 19 further characterized in that bacterial growth is retarded.

References Cited

UNITED STATES PATENTS

| | | | |
|---|---|---|---|
| 2,836,512 | 5/1958 | Sample | 117—65 |
| 2,942,008 | 6/1960 | Lubowe | 252—364 |
| 3,044,936 | 7/1962 | Achelis et al. | 424—337X |
| 3,067,096 | 12/1962 | Trace et al. | 424—337X |
| 3,068,142 | 12/1962 | Bader et al. | 424—337X |

FOREIGN PATENTS

| | | |
|---|---|---|
| 810,377 | 3/1959 | Great Britain. |
| 234,383 | 9/1959 | Australia. |

OTHER REFERENCES

Foley et al.: Ann. New York Acad. Sci. 76, pp. 413–441 (1958).

SHEP K. ROSE, Primary Examiner

U.S. Cl. X.R.

21—58; 117—138.5; 162—161, 190; 195—123; 210—64; 424—253, 292, 347